(12) United States Patent
Pino et al.

(10) Patent No.: US 11,746,248 B2
(45) Date of Patent: Sep. 5, 2023

(54) TEXTILE COAT RUBBER COMPOSITION FOR A TIRE AND A TIRE COMPRISING A TEXTILE COAT RUBBER COMPOSITION

(71) Applicant: THE GOODYEAR TIRE & RUBBER COMPANY, Akron, OH (US)

(72) Inventors: Adrian Osvaldo Balaguer Pino, Luxembourg (LU); Julia Martine Francoise Claudine Tahon, Reckange (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 320 days.

(21) Appl. No.: 16/901,415

(22) Filed: Jun. 15, 2020

(65) Prior Publication Data

US 2020/0399498 A1 Dec. 24, 2020

Related U.S. Application Data

(60) Provisional application No. 62/862,964, filed on Jun. 18, 2019.

(51) Int. Cl.

| | |
|---|---|
| *B60C 1/00* | (2006.01) |
| *B60C 9/00* | (2006.01) |
| *C08K 3/04* | (2006.01) |
| *C08K 5/18* | (2006.01) |
| *C08K 9/04* | (2006.01) |
| *C08L 7/00* | (2006.01) |
| *C09D 109/06* | (2006.01) |
| *B60C 9/22* | (2006.01) |
| *C08K 3/06* | (2006.01) |
| *C08K 3/36* | (2006.01) |
| *C08K 5/098* | (2006.01) |
| *C08K 5/20* | (2006.01) |
| *C08K 5/3415* | (2006.01) |
| *C08K 5/3492* | (2006.01) |
| *C09D 147/00* | (2006.01) |

(52) U.S. Cl.
CPC ............ *C09D 109/06* (2013.01); *B60C 1/00* (2013.01); *B60C 9/0042* (2013.01); *B60C 9/22* (2013.01); *C08K 3/04* (2013.01); *C08K 3/06* (2013.01); *C08K 3/36* (2013.01); *C08K 5/098* (2013.01); *C08K 5/20* (2013.01); *C08K 5/3415* (2013.01); *C08K 5/3492* (2013.01); *C09D 147/00* (2013.01); *B60C 2001/0083* (2013.01); *B60C 2009/0035* (2013.01); *B60C 2009/2238* (2013.01)

(58) Field of Classification Search
CPC ..... C08L 7/00; C08L 9/00; C08L 9/06; C09D 107/00; C09D 109/00; C09D 109/06; C09D 147/00; C08K 3/04
See application file for complete search history.

(56) References Cited

U.S. PATENT DOCUMENTS

| | | | |
|---|---|---|---|
| 5,049,618 A | 9/1991 | Wideman et al. | |
| 5,229,459 A | 7/1993 | Sandstrom et al. | |
| 6,273,162 B1* | 8/2001 | Ohara | B60C 1/0008 152/546 |
| 6,608,125 B2 | 8/2003 | Cruse et al. | |
| 2003/0130535 A1 | 7/2003 | Deschler et al. | |
| 2006/0167173 A1* | 7/2006 | Amino | C08K 3/04 524/575.5 |
| 2014/0128532 A1 | 5/2014 | Nakamura et al. | |
| 2014/0326928 A1 | 11/2014 | Kitago et al. | |
| 2015/0291777 A1* | 10/2015 | Fujii | C08K 9/04 524/217 |
| 2017/0218170 A1* | 8/2017 | Hatano | B60C 5/14 |

FOREIGN PATENT DOCUMENTS

| | | |
|---|---|---|
| EP | 0105822 B1 | 6/1988 |
| EP | 2708575 B1 | 1/2016 |
| EP | 2708382 B1 | 3/2016 |
| EP | 3031627 B1 | 1/2020 |

OTHER PUBLICATIONS

European Search Report for EP Patent Application EP 20180374 dated Oct. 15, 2020.

\* cited by examiner

*Primary Examiner* — Irina S Zemel
*Assistant Examiner* — Jeffrey S Lenihan
(74) *Attorney, Agent, or Firm* — Alvin T. Rockhill

(57) ABSTRACT

In accordance with the invention, a textile cord coat composition for a tire comprises from 70 to 90 phr cis 1,4-polyisoprene rubber, from 10 to 30 phr styrene butadiene rubber, from 25 to 45 phr carbon black, the latter comprising between 1 and 6 phr high surface area carbon black having a BET surface area of more than 700 m²/g. Moreover, the invention is directed to a textile reinforced ply and a tire comprising such a textile cord coat composition.

18 Claims, 1 Drawing Sheet

TEXTILE COAT RUBBER COMPOSITION FOR A TIRE AND A TIRE COMPRISING A TEXTILE COAT RUBBER COMPOSITION

This application claims benefit of U.S. Provisional Patent Application Ser. No. 62/862,964, filed on Jun. 18, 2019. The teachings of U.S. Provisional Patent Application Ser. No. 62/862,964 are incorporated herein by reference in their entirety.

FIELD OF THE INVENTION

The present invention is directed to a rubber composition for use in a tire, in particular a textile or fabric coat rubber composition as, for instance, for carcass, belt or overlay plies, or also ply strips. Moreover, the present invention is drawn to a tire comprising such components and/or compositions.

BACKGROUND

The use of silica in rubber compositions has increased over the past decades, for instance due to advantageous hysteresis properties. However, extended use of silica compounds may also have the disadvantage of a decreased design freedom, especially with regards to providing electrically conductive passages through the tire. Thus, depending on the specific application, the use of carbon black may still be desirable in many compositions. While there have also been improvements in the field of carbon black fillers and their application in rubber compositions over the past years, significant room for improvement still remains.

SUMMARY OF THE INVENTION

A first object of the invention may be to provide rubber compositions that allow building tires or tire components, especially textile cord reinforced plies or ply strips with an acceptable level of electrical conductivity and acceptable mechanical or physical properties, such as for instance sufficient tear strength.

Another object of the invention may be to provide a textile cord coat rubber composition with sufficient stiffness and acceptable hysteresis properties while ensuring also sufficiently good tear strength.

Another object of the invention may be to provide advanced cord coat compositions for pneumatic tires.

In one aspect of the invention, a rubber composition is provided, in particular a textile cord coat (rubber) composition, comprising from 70 to 90 phr cis 1,4-polyisoprene rubber, from 10 to 30 phr styrene butadiene rubber, from 25 to 45 phr carbon black, wherein the carbon black comprises from 1 to 10 phr (high/ultra high) surface area carbon black having a BET (Brunauer-Emmett-Teller) surface area (in particular nitrogen adsorption surface area NSA) of more than 700 $m^2/g$. The term "phr" stands for "parts by weight per 100 parts of rubber."

The inventors have unexpectedly found that use of such high surface area carbon black has improved the tear strength of the coat composition while maintaining good rebound and tangent delta properties which may be an indication for the hysteresis behavior of the material.

The cis 1,4-polyisoprene rubber shall be understood to cover natural rubber and synthetic polyisoprene rubber. Thus, the composition could comprise only natural rubber, only synthetic polyisoprene or both types of rubber. In an embodiment, the composition comprises natural rubber and synthetic polyisoprene rubber, wherein the portion of natural rubber is higher than the portion of synthetic polyisoprene rubber. Synthetic cis 1,4-polyisoprene and cis 1,4-polyisoprene natural rubber are well known to those having skill in the rubber art. A reference to cis 1,4-polyisoprene rubber may be understood as a 1,4-polyisoprene rubber having at least 90 percent cis-content, preferably at least 92 percent cis-content or at least 95 percent cis-content.

In an embodiment, the composition comprises from 2 to 6 phr of the high surface area carbon black, or optionally from 2 to 5 phr. It has been found that such amounts are already sufficient for achieving the desired properties without other significant tradeoffs.

In another embodiment, the composition comprises from 75 to 90 phr cis 1,4-polyisoprene rubber, from 10 to 25 phr styrene butadiene rubber, from 25 to 40 phr carbon black, optionally comprising from 2 to 5 phr high surface area carbon black.

In another embodiment, the high surface area carbon black has a BET surface area of more than 800 $m^2/g$, optionally more than 900 $m^2/g$ and/or up to 1500 $m^2/g$ or up to 1100 $m^2/g$. In general, the BET surface area may be determined according to ASTM D6556.

In yet another embodiment, the high surface area carbon black has also a high (or ultra high) structure, for instance defined by an oil absorption value/number of more than 200 ml/100 g or more than 300 ml/100 g, and optionally between 350 and 500 ml/100 g.

In yet another embodiment, the high surface area carbon black has an average particle size of between 10 and 50 nm, optionally between 20 and 40 nm or between 25 and 35 nm.

It shall be emphasized that the material of the invention can have the properties of multiple of the embodiments described herein. For instance, the carbon black may have the high surface and high structure properties described herein, such as but not limited to a surface area of between 900 $m^2/g$ and 1500 $m^2/g$, an oil adsorption number of between 300 ml/100 g and 500 ml/100 g and an average particle size of between 20 nm and 40 nm.

In still another embodiment, the composition comprises a carbon black coupling agent for enhancing the coupling between the rubber, in particular the natural rubber and the carbon black. Such a coupling agent may have amino groups for coupling to carbon black and double bonds for reaction with the natural rubber.

In an embodiment, the composition comprises from 0.1 to 5 phr of a carbon black coupling agent, optionally between 0.5 and 3 phr of a carbon coupling agent.

In another embodiment, the composition comprises from 2 to 15 phr of oil, e.g. TDAE oil. It could comprise also from 3 to 10 phr of such oil. In an embodiment, the rubber composition may include such oil as processing oil. Oil may be included in the rubber composition as extending oil typically used to extend elastomers. Processing oil may also be included in the rubber composition by addition of the oil directly during rubber compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In still another embodiment, the composition comprises from 3 to 7 phr sulfur, and/or from 1 to 10 phr zinc oxide, optionally between 1 and 6 phr zinc oxide.

The composition could comprise also up to 10 phr of a (optionally precipitated) silica, optionally between 1 and 5 phr of such material.

In another embodiment, the composition comprises from 4 to 10 phr of a resin. The resin could be a combination of a carbamid acid butyl ester and a hexamethoxymethylmelamine (reactive resin system). In particular, the use of such a resin increases the compound stiffness.

In one embodiment, the rubber composition may contain a conventional sulfur containing organosilicon compound. Examples of suitable sulfur containing organosilicon compounds are of the formula:

A-Alk-Sn-Alk-Z  (I)

in which Z is selected from the group consisting of

wherein $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

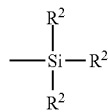

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The remaining carbon black filler could for instance be conventional carbon black such as one or more of ASTM grades N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks may have iodine absorptions ranging from 9 g/kg to 145 g/kg and DBP number ranging from 34 cm$^3$/100 g to 150 cm$^3$/100 g.

In one embodiment of the subject invention the rubber composition includes a carbon black coupling agent which is of the structural formula:

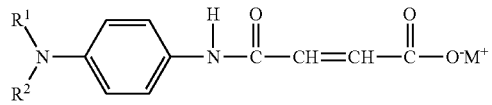

wherein $R^1$ and $R^2$ can be the same or different and represent hydrogen atoms or an alkyl group, alkenyl group or alkynyl group containing from 1 to 20 carbon atoms; and wherein M$^+$ represents a sodium, potassium, or lithium ion. In these carbon black coupling agents at least one of $R^1$ and $R^2$ will typically represent a hydrogen atom and in many cases both $R^1$ and $R^2$ will represent hydrogen atoms. M$^+$ will typically be a sodium ion, a potassium ion, or a lithium ion with sodium ions normally being preferred. Sodium (2Z)-4-[(aminophenyl)amino]-4-oxo-2-butanoate is a commercially available carbon black coupling agent which is sold by Sumitomo Chemical Co., Ltd. as Sumilink® 200. In many cases the carbon black coupling will be included in the rubber composition at a level which is within the range of 0.1 phr to 5 phr. The carbon black coupling agent will typically be included in the rubber composition at a level which is within the range of 0.5 phr to 3 phr.

The rubber composition can also advantageously include a "methylene donor" and a "methylene acceptor" as described in U.S. Pat. No. 5,229,459 the teachings of which are incorporated herein by reference in their entirety. The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative of those compounds which may be used as a methylene acceptor include resorcinol, hydroquinone, and hydroxyphenylmonomaleimides of the formula:

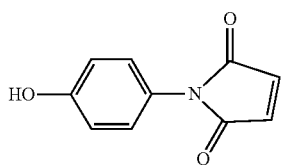 [SMILES: O=C1C=CC(=O)N1c1ccc(O)cc1]

Use of the hydroxyphenylmaleimides of the above formula is disclosed in U.S. Pat. No. 5,049,618, the teachings of which are incorporated herein by reference herein in their entirety. The amount of methylene acceptor that is included in the rubber stock may vary depending on the type of rubber, the particular methylene acceptor, the particular methylene donor and the desired physical properties, i.e., adhesion and tear. Generally speaking, the amount of methylene acceptor may range from about 0.1 phr to about 10 phr. Preferably, the amount of methylene acceptor ranges from about 0.5 phr to about 5.0 phr.

The rubber stock of the present invention contains a methylene donor which is suitable for reaction with the methylene acceptor. Examples of methylene donors which are suitable for use in the present invention include hexamethylenetetramine, hexaethoxymethylmelamine, hexamethoxymethylmelamine, lauryloxymethoxypyridinium chloride, ethoxymethylpyridinium chloride, trioxan hexamethoxymethylmelamine, the hydroxy groups of which may be esterified or partially esterified. In addition the methylene donors may be N-substituted oxymethylmelamines of the formula:

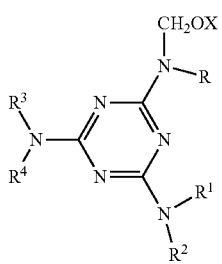

wherein X is an alkyl having from 1 to 8 carbon atoms, R, $R^1$, $R^2$, $R^3$, and $R^4$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods. The amount of methylene acceptor that is present in the rubber stock may vary depending on the type of rubber, the particular methylene acceptor, the particular methylene donor and the desired physical properties, i.e., adhesion and tear. Generally speaking, the amount of methylene donor may range from about 0.1 phr to about 10 phr. Preferably, the amount of methylene donor ranges from about 0.5 phr to about 5.0 phr.

The weight ratio of methylene donor to methylene acceptor can vary. Generally speaking, the weight ratio will range from about 1:10 to about 10:1. Preferably, the weight ratio ranges from about 1:3 to 3:1.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively from about 0.8 phr to about 1.5 phr. In another embodiment, combinations of a primary and a secondary accelerator might be used with the secondary accelerator being used in smaller amounts, such as from about 0.05 phr to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) of the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a second aspect of the invention a (pneumatic) tire is provided, the tire comprising one or more of at least one carcass ply, at least one belt ply, at least one ply strip, and at least one overlay ply, wherein at least one of the plies or strips comprises textile cords coated with the cord coat (rubber) composition in accordance with the invention.

The textile cords will typically be comprised of an aramid, a polyamide (nylon), a polyester, or a combination thereof. Such aramid yarns are comprised of long-chain aromatic polyamides in which typically at least 85% of the amide linkages (—CO—NH—) therein are attached directly to two aromatic rings. Poly(p-phenyleneterephtalamide) is a representative example of such a aramid that can be utilized in accordance with this invention. Aramid which is suitable for use in the practice of this invention is commercially available from DuPont under the tradename Nomex®, Kevlar® 29, Kevlar® 49, Kevlar® 119, Kevlar® 129, and Kevlar® 149. Aramid which is suitable for use in the practice of this invention is also commercially available from Teijin under the tradename Twaron®. The polyamide (non-aromatic) cords that can used in the practice of this invention can be prepared by reacting a dibasic acid with a diamine, such as nylon-6,6 (synthesized by reacting hexamethylene diamine with adipic acid), nylon-6,9 (synthesized by reacting hexamethylene diamine with azelaic acid), nylon-6,10 (synthesized by reacting hexamethylene diamine with sebacic acid), nylon-6,12 (synthesized by reacting hexamethylene diamine with dodecanedioic acid), or nylon-4,6 (synthesized by reacting 1,4-diaminobutane with adipic acid). In the alternative, the polyamide that is used in the practice of this invention can be prepared by the polymerization of an amino acid or an amine acid derivative, such as nylon-6 (made by the polymerization of ε-caprolactam), nylon-11 (made by the polymerization of undecanoic acid), or nylon-12 (made by the polymerization of laurolactam). Polyester cords that can be used include those that are comprised of polyetheylene terephthalate or polyethylene naphthalate.

In an embodiment, the tire is one or more of a radial tire, a passenger tire, a pneumatic tire, and a race tire. Such a pneumatic tire is typically comprised of a generally toroidal-shaped carcass with an outer circumferential tread, two spaced beads, and sidewalls extending radially from and connecting said tread to said beads, wherein said tread is adapted to be ground-contacting, and wherein the pneumatic tire is further comprised of a reinforcing textile ply which is comprised of a plurality of substantially parallel reinforcing textile cords which are embedded in a textile cord coat rubber composition, wherein the textile cord coat rubber composition is comprised of 70 phr to 90 phr of cis 1,4-polyisoprene rubber, 10 phr to 30 phr of styrene-butadiene rubber, 25 phr to 45 phr of carbon black, wherein the carbon black includes from 1 phr to 10 phr of a high surface area carbon black having a BET surface area of more than 700 m$^2$/g, and wherein textile reinforcing textile ply is a carcass ply, a belt ply, an overlay ply or a ply strip. In one embodiment the reinforcing textile ply is a belt ply that extends from bead to bead.

BRIEF DESCRIPTION OF THE DRAWINGS

The structure, operation, and advantages of the invention will become more apparent upon contemplation of the following description taken in conjunction with the accompanying drawings.

DETAILED DESCRIPTION OF THE EMBODIMENTS

Figure 1:
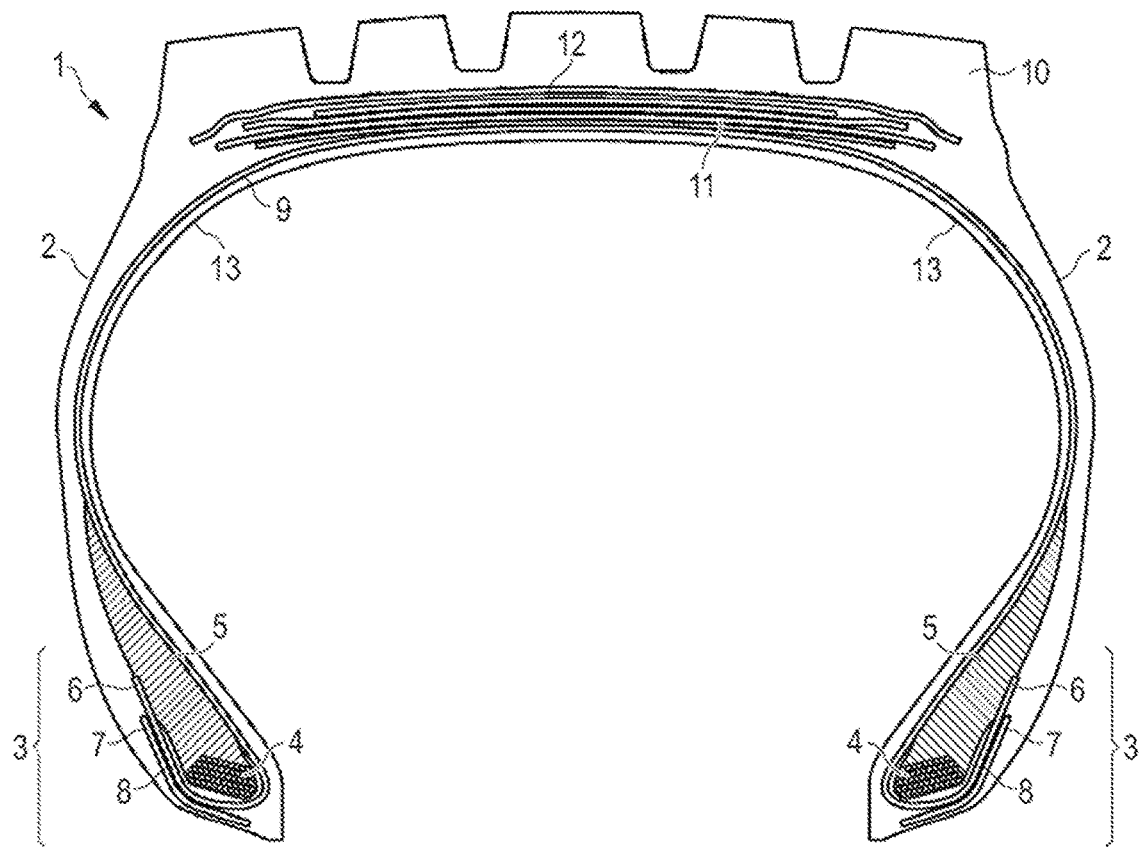
FIG. 1 is a schematic cross section of a tire comprising amongst others belt plies and carcass plies comprising the rubber composition in accordance with an embodiment of the invention.

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt plies 11 and overlay ply 12 comprise a rubber composition in accordance with the invention and may have a plurality of substantially parallel reinforcing members made of metal wire and/or textile cords. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

Figure 2:
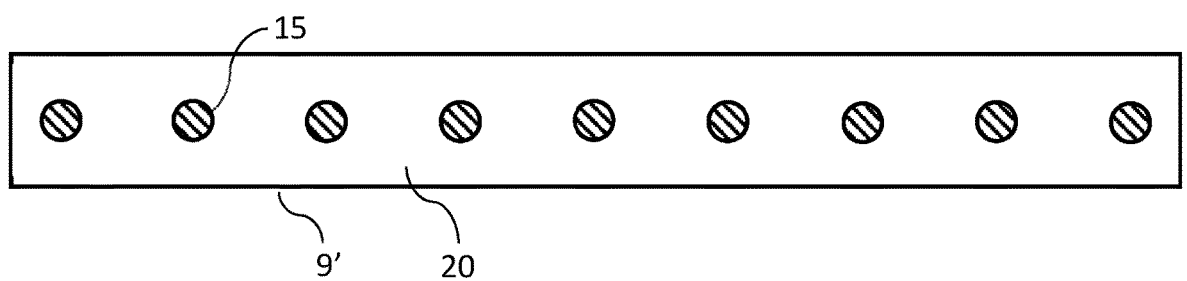
FIG. 2 is a schematic cross section of a ply comprising textile cords and textile cord coat material in accordance with an embodiment of the invention.

The schematic cross-section of FIG. 2 shows a ply, e.g. a carcass, belt or overlay ply 9' which comprises a plurality of cords 15 reinforcing the rubber composition material/textile coat 20. Typically, such a ply is made in a textile calender in which a textile, or in other words a textile sheet, is coated from both sides with a layer or sheet of rubber composition 20. Such methods are well known to the person skilled in the art of tire building. After curing, the textile cords 15 are embedded in the rubber composition 20, reinforcing the same.

Cords 15 may also be dipped in dipping solutions or emulsions for better adhesion properties as known in the art. A dip is not shown here in FIG. 2.

While the schematic drawing of FIG. 2 indicates nine cords, the number of cords per ply could be different, in particular higher such as from 10 to 40, or from 15 to 35). The invention could also be used in a ply strip comprising the rubber composition, with the strip comprising less than 9 parallel cords.

A preferred example of a rubber composition according to the invention is shown in Table 1 in comparison with a Control Sample. Both compositions include the same content of natural rubber, synthetic polyisoprene and styrene butadiene rubber (SBR). Likewise, both samples comprise at least 30 phr conventional carbon black and small amounts of precipitated silica. However, in particular the silica is not deemed to be essential for the invention. In particular, the amount of silica is preferably below 10 phr. Both compositions comprise a carbon black to natural rubber coupling agent comprising on the one hand amino groups for coupling the agent to the carbon black and on the other hand double bonds of an olefinic group or part of the agent. Both compositions comprise also a reactive resin system for enhancing adhesion of the rubber to the cords. Oil has been added by the utilized SBR which is oil extended by TDAE oil. Apart from typical amounts of antidegradants (e.g. an antioxidizing agent), the compositions comprise a cure package having about 3 phr zinc oxide, about 3 phr stearic acid, about 1 phr accelerator and about 3 phr sulfur.

As an important difference, the Inventive Example comprises 3 phr high surface area carbon black, with a BET surface area of about 1000 m²/g. The average particle size of the carbon black is at about 30 nm. The oil adsorption number, which is indicating the high structure of the high surface area carbon black, is at about 420 ml/100 g. Moreover, the high surface area carbon black is also electrically conductive.

TABLE 1

| Material | Parts by weight (phr) | |
|---|---|---|
| | Control | Inventive Example |
| Natural rubber | 70 | 70 |
| Synthetic Polyisoprene | 12.5 | 12.5 |
| SBR[1] | 17.5 | 17.5 |
| Carbon Black | 33 | 30 |
| Precipitated Silica | 3 | 3 |
| High Surface Area Carbon Black[2] | 0 | 3 |
| Carbon Black Coupling agent[3] | 1 | 1 |
| Resin[4] | 6.5 | 6.5 |
| Zinc Oxide | 3 | 3 |
| Oil[5] | 6.5 | 6.5 |
| Antidegradants | 1 | 1 |
| Stearic Acid | 3 | 3 |
| Accelerator[6] | 1 | 1 |
| Sulfur | 3 | 3 |

[1]TDAE oil extended styrene butadiene rubber
[2]Conductive carbon black as Printex XE2-B ™ from the Carycompany
[3]Sodium (2Z)-4-[(aminophenyl)amino]-4-oxo-2-butanoate as Sumilink® 200 carbon black coupling agent from Sumitomo Chemical Co., Ltd.
[4]Reactive resin system comprising a carbamid acid butyl ester and a hexamethoxymethylmelamine.
[5]TDAE oil from the extended SBR
[6]Sulfur cure accelerators as sulfenamide Table 2 discloses mechanical test results for the Control composition and the Example composition disclosed in Table 1. The electrically conductive carbon black used in the Inventive Example improves slightly the stiffness over the Control Sample. For instance, the Shore A hardness has increased slightly and the same applies for G' at low strain. The rebound value has slightly decreased but is still deemed at an acceptable level. The loss factor tangent delta did essentially not change. Modulus values are a bit higher which applies also to tensile strength. Elongation at break results are lower in the Inventive Example than in the Control.

While the changes in the above-mentioned values are in the order of 10% or even considerably lower, the inventive composition shows a remarkable change in the tear strength which has improved by about 72% over the control. Moreover, the tear strength value of the Control is deemed below an acceptable threshold level of about 5 N/mm (in particular when considering overlay plies) whereas the Inventive Example is almost 50% above said crucial threshold.

TABLE 2

| Test/Property | Units | Control | Inventive Example |
|---|---|---|---|
| Shore A hardness (23° C.)[a] | — | 52.1 | 53.9 |
| Rebound (23° C.)[b] | % | 66.0 | 64.6 |
| G' (1%) c | MPa | 0.7 | 0.8 |
| Tan delta (10%)[c] | — | 0.05 | 0.05 |
| Modulus (100%)[d] | MPa | 1.4 | 1.5 |
| Modulus (200%)[d] | MPa | 3.2 | 3.8 |
| Modulus (300%)[d] | MPa | 6.1 | 7.3 |
| Elongation at break[d] | % | 544 | 537 |
| Tensile strength[d] | MPa | 14.8 | 16.4 |
| Tear Strength[e] | N/mm | 4.3 | 7.4 |

[a] Shore A hardness measured according to ASTM D2240
[b] Rebound measured on a Zwick Roell ™ 5109 rebound resilience tester according to DIN 53512/ASTM D1054 at given temperature
[c] Data obtained with an RPA 2000 ™ Rubber Process Analyzer of Alpha Technologies based on ASTM D5289.
[d] Ring sample test based on ASTM D412 and DIN 53504, percentages are percentages of elongation, respectively strain; tensile strength is stress at break; elongation is elongation at break in %
[e] Strebler tear strength test according to DIN 53539

The amounts of materials are usually expressed in parts of material per 100 parts of rubber by weight (phr).

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case, the above described embodiments and examples shall not be understood in a limiting sense. In particular, the features of the above embodiments may also be replaced or combined with one another.

The invention claimed is:

1. A textile cord coat rubber composition comprising: from 70 phr to 90 phr of cis 1,4-polyisoprene rubber, wherein the cis 1,4-polyisoprene rubber is comprised of natural rubber and synthetic polyisoprene rubber, and wherein the portion of natural rubber is higher than the portion of synthetic polyisoprene rubber, from 10 phr to 30 phr of styrene-butadiene rubber, from 25 phr to 45 phr of carbon black, from 1 phr to 10 phr of silica, and from 0.1 phr to 5 phr of a carbon black coupling agent of the structural formula:

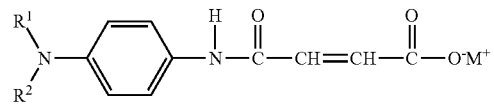

wherein $R^1$ and $R^2$ can be the same or different and represent hydrogen atoms or an alkyl group, alkenyl group or alkynyl group containing from 1 to 20 carbon atoms; and wherein $M^+$ represents a sodium ion, a potassium ion, or a lithium ion, wherein said composition is further comprised of a resin at a level which is within the range of 4 phr to 10 phr, wherein the resin is a combination of carbamid acid butyl ester and hexamethoxymethylmelamine, wherein the carbon black includes a conventional carbon black of one or more ASTM grades selected from the group consisting of N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990, and N991, and from 1 phr to 10 phr of a high surface area carbon black having a BET surface area of more than 700 m²/g.

2. The textile cord coat rubber composition of claim 1 wherein the cis 1,4-polyisoprene rubber is present at a level which is within the range of 75 phr to 90 phr, wherein the styrene-butadiene rubber is present at a level which is within the range of 10 phr to 25 phr, wherein the carbon black is present at a level which is within the range of 25 phr to 40 phr, and wherein the carbon black includes from 2 phr to 5 phr of the high surface area carbon black.

3. The textile cord coat rubber composition of claim 1, wherein the high surface area carbon black has a BET surface area which is within the range of 900 m²/g to 1500 m²/g; and wherein the high surface area carbon black has an average particle size which is within the range of 20 nm to 40 nm.

4. The textile cord coat rubber composition of claim 1, wherein the high surface area carbon black has an oil absorption value of more than 300 ml/100 g.

5. The textile cord coat rubber composition of claim 1, wherein $R^1$ and $R^2$ represent hydrogen atoms and wherein $M^+$ represents a potassium ion.

6. The textile cord coat rubber composition of claim 1, wherein the carbon black coupling agent is present at a level which is within the range of 0.5 phr to 3 phr.

7. The textile cord coat rubber composition of claim 1, wherein said composition is further comprised of 3 phr to 7 phr of sulfur.

8. The textile cord coat rubber composition of claim 1, wherein said resin is present in the composition at a level which is within the range of 5 phr to 8 phr.

9. The textile cord coat rubber composition of claim 1, wherein said composition is further comprised of a methylene donor and a methylene acceptor, and wherein the weight ratio of the methylene donor to the methylene acceptor is within the range of 1:3 to 3:1.

10. The textile cord coat rubber composition of claim 9, wherein the methylene acceptor is of the chemical structural formula:

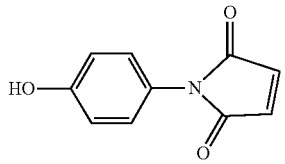 [SMILES: O=C1C=CC(=O)N1c1ccc(O)cc1]

and wherein the methylene acceptor is present at a level which is within the range of 0.1 phr to 10 phr, and wherein the methylene donor is of the chemical structural formula:

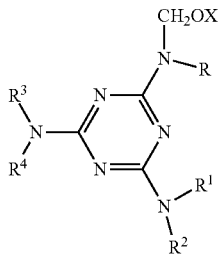

wherein X represents an alkyl group having from 1 to 8 carbon atoms, and wherein R, $R^1$, $R^2$, $R^3$, and $R^4$ can be the same or different and are individually selected from the group consisting of hydrogen atoms, alkyl groups having from 1 to 8 carbon atoms, —CH₂OX groups or their condensation products.

11. The textile cord coat rubber composition of claim 1 wherein the carbon black coupling agent is present in the textile cord coat rubber composition at a level which is within the range of 0.5 phr to 3 phr.

12. The textile cord coat rubber composition of claim 1, wherein $R^1$ and $R^2$ represent hydrogen atoms and wherein $M^+$ represents a lithium ion.

13. A textile reinforced ply which is comprised of a textile cord coat rubber composition and a plurality of parallel reinforcing textile cords which are embedded in the textile cord coat rubber composition, wherein textile cord coat rubber composition is comprised of from 70 phr to 90 phr of cis 1,4-polyisoprene rubber, wherein the cis 1,4-polyisoprene rubber is comprised of natural rubber and synthetic polyisoprene rubber, and wherein the portion of natural rubber is higher than the portion of synthetic polyisoprene rubber, from 10 phr to 30 phr of styrene-butadiene rubber, from 25 phr to 45 phr of carbon black, from 1 phr to 10 phr of silica, and from 0.1 phr to 5 phr of a carbon black coupling agent of the structural formula:

wherein $R^1$ and $R^2$ can be the same or different and represent hydrogen atoms or an alkyl group, alkenyl group or alkynyl group containing from 1 to 20 carbon atoms; and wherein $M^+$ represents a sodium ion, a potassium ion, or a lithium ion, wherein said composition is further comprised of a resin at a level which is within the range of 4 phr to 10 phr, wherein the resin is a combination of carbamid acid butyl ester and hexamethoxymethylmelamine, and wherein the carbon black includes a conventional carbon black of one or more ASTM grades selected from the group consisting of N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990, and N991, and from 1 phr to 10 phr of a high surface area carbon black having a BET surface area of more than 700 m²/g.

14. The textile reinforced ply of claim 13, wherein the rubber composition is further comprised of a methylene donor and a methylene acceptor, wherein the weight ratio of the methylene donor and the methylene acceptor is within the range of 1:3 to 3:1.

15. The textile reinforced ply of claim 14 wherein the methylene acceptor is of the chemical structural formula:

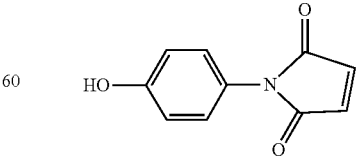

and wherein the methylene acceptor is present at a level which is within the range of 0.1 phr to 10 phr, and the methylene donor is of the chemical structural formula:

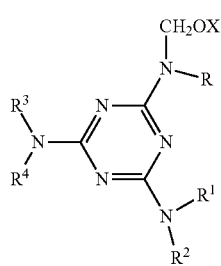

wherein X represents an alkyl group having from 1 to 8 carbon atoms, and wherein R, $R^1$, $R^2$, $R^3$, and $R^4$ can be the same or different and are individually selected from the group consisting of hydrogen atoms, alkyl groups having from 1 to 8 carbon atoms, —$CH_2OX$ groups or their condensation products.

16. The textile reinforced ply of claim 13 wherein the textile reinforced ply is a carcass ply, a belt ply, an overlay ply or a ply strip.

17. A pneumatic tire which is comprised of a toroidal-shaped carcass with an outer circumferential tread, two spaced beads, at least one ply as specified in claim 13, wherein the textile reinforced ply extends from bead to bead, and sidewalls extending radially from and connecting said tread to said beads, and wherein said tread is adapted to be ground-contacting.

18. A pneumatic tire which is comprised of a toroidal-shaped carcass with an outer circumferential tread, two spaced beads, and sidewalls extending radially from and connecting said tread to said beads, wherein said tread is adapted to be ground-contacting, and wherein the pneumatic tire is further comprised of a reinforcing ply as specified in claim 16.

* * * * *